United States Patent [19]

Katz et al.

[11] Patent Number: 4,932,046
[45] Date of Patent: Jun. 5, 1990

[54] TELEPHONE PROGRAMMING SYSTEM FOR AUTOMATED CALLING

[75] Inventors: Ronald A. Katz, Los Angeles, Calif.; Dennis L. Ross, Omaha, Nebr.

[73] Assignee: First Data Resources Inc.

[21] Appl. No.: 386,076

[22] Filed: Jul. 28, 1989

[51] Int. Cl.$^5$ .............................................. H04M 3/14
[52] U.S. Cl. ..................................... 379/32; 379/457; 379/352; 379/81
[58] Field of Search .................... 379/32, 33, 381, 457, 379/350, 352, 81

[56] References Cited

U.S. PATENT DOCUMENTS 4,314,103  2/1982  Wilson ................................. 379/81

Primary Examiner—Stafford D. Schreyer

[57] ABSTRACT

A system automates interface intervals with remote telephone terminals as to provide information or advice in response to select tone signals formed at a telephone terminal, and at the conclusion of an interval provides a disconnect or termination signal prompting a caller to "hang up". Disconnect signals simulate known sounds, specifically as the "click" attendant a remote "hang up" and the traditional dial tone. The disconnect signals are transmitted to a caller after an interface interval to prompt the caller to "hang up" and release the telephone line connection.

8 Claims, 2 Drawing Sheets

TELEPHONE PROGRAMMING SYSTEM FOR AUTOMATED CALLING

BACKGROUND AND SUMMARY OF THE INVENTION

In recent years, telephone service has been widely expanded to embrace a great many new applications. For example, in one aspect, telephone systems have been linked with data processors to variously interface callers and data banks. Such automated arrangements have been used variously to inform, entertain and advise callers. Specific examples of these telephone services include the provision of: market advice, sports activity information, messages of encouragement and reports on status—as for commercial accounts. Typically, a caller at a remote terminal actuates the terminal keypad to generate tones with digital significance to select a desired program or format.

Many computer-telephone interface systems have been implemented using the so-called "800" and "900" telephone system services. Generally, the "800" service is offered with no charge to callers. Using the "900" service, the caller typically is charged a fixed amount that includes the telephone call charge.

In most arrangements, involving either "800" or "900" service, the interests of the service entity (computer interface service) are best served when calls are promptly terminated. That is, when a message has been communicated or a transaction completed, it is desirable that the caller promptly terminate the call by the action generally described as to "hang up" or go "on hook". However, it has been discovered that in the provision of volume caller services, significant numbers of callers remain on the line, staying "off hook", perhaps waiting for some further or repeat communication. Such action holds the line open. That is, in accordance with conventional telephone system operation, so long as a caller remains "off hook", the connected line remains captured. In recognition of these considerations and in accordance herewith, it has been determined that lingering callers impose a substantial economic penalty to automated telephone systems.

If telephonic computer interfaces are offered through "800" service, lingering callers increase telephone time charges that are borne by the interface service organization. Similarly, offering "900" call service at a fixed cost incurs useless charges from lingering callers. Furthermore, regardless of the type of service utilized, usually it is important to clear calls in an expedient manner in the interests of system efficiency and economy as related to the computer interface equipment.

Recognizing the significance of lingering callers to telephonic interface systems, the present invention is directed to a telephone programming system incorporating elements for controlling calls and terminating line connections promptly after each communication is concluded. The system of the present invention is proposed for use with a traditional telephone facility and interfaces callers, as to provide an interval of communication, after which a signal generator prompts callers intuitively to release lines by going "on hook". Specifically, a signal generator is provided in the system of the present invention to supply synthesized-sound disconnect signals for transmission to the calling telephone terminal where intuitive audio termination sounds are generated, e.g. a "hang up click" and/or a dial tone. Usually, such sounds prompt lingering callers to go "on hook" releasing the telephone line for use by another caller and terminating call charges.

BRIEF DESCRIPTION OF THE DRAWINGS

In the drawings, which constitute a part of this specification, exemplary embodiments exhibiting various objectives and features hereof are set forth, specifically.

DESCRIPTION OF THE ILLUSTRATIVE EMBODIMENT

As required, a detailed illustrative embodiment of the present invention is disclosed herein. However, physical elements, communication systems, data formats and operating structures in accordance with the present invention may be embodied in a wide variety of different forms, some of which may be quite different from those of the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

Figure 1:
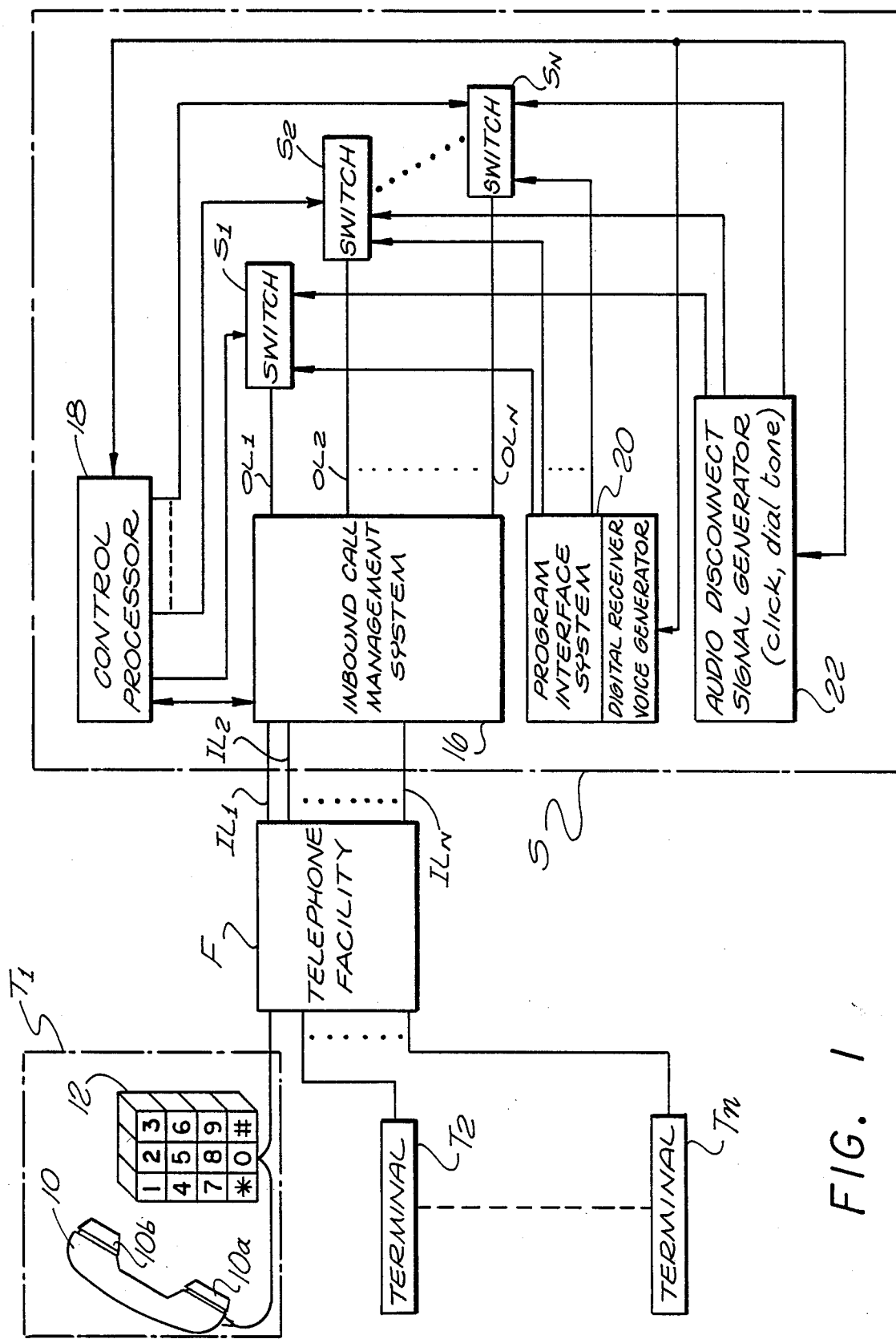
FIG. 1 is a block diagram of a system constructed in accordance with the present invention.

Referring initially to FIG. 1, a series of remote telephone terminals T1-TN are represented at the left of the drawing. The terminals T1-TN are generally similar and, accordingly, only the terminal T1 is illustrated in any detail. In the disclosed embodiment, the remote terminals T1-TN may comprise various forms of telephone terminals coupled to a telephone facility F, comprising a comprehensive telephone system for interconnecting any associated terminals.

The telephone facility F is also coupled through a plurality of lines to a caller interface system S including a processor. Generally, in accordance with the present development, individual callers use the individual telephone terminals T1-TN to interface the system S through the telephone facility F. The interface between caller and processor might involve any of a wide variety of communications which progress through a predetermined format or pattern to a point of termination. The caller interface system might provide information. as for example, relating to market conditions. In such a system, the caller might be offered various selections to attain specific desired information, selection being accomplished by the caller. In accordance herewith, after the information has been provided, the system S provides disconnect signals, as disclosed in detail below, intuitively prompting the caller to "hang up" or "go on hook".

Considering the system of FIG. 1 in somewhat greater detail, the telephone facility F comprises a public telephone facility and the individual telephone terminals may take any of many forms of existing telephone instruments. In that regard, the telephone terminal T1 is represented in some detail to include a handpiece 10 (microphone 10a and earphone 10b) and a key panel 12 providing a rectangular array of push buttons. As illustrated, the push buttons in the panel 12 are designated and arranged in a conventional configuration and function to form digitally significant tones.

At the right of the telephone facility F as illustrated in FIG. 1, the caller interface system S is shown receiving a number of input lines IL1-ILN. The lines, which may number in the thousands, are received by a call management system 16 which is connected to a control processor 18 (FIG. 1, top).

Essentially, the control processor 18 specifies the operating patterns for the interface system S and in that sense the inbound call management system 16 is controlled to accept calls on the lines IL1-ILN which are then passed through operating lines OL1-OLN to switches S1-SN.

A wide variety of equipment may be employed to function as the call management system 16 which may incorporate a variety of call processors, audio response units and composite switches as such structures are known and used in telephone applications. Functionally, the system 16 accepts a multitude of calls for individual processing by a program interface system 20.

The control processor 18 may comprise any of a variety of computers, the capacity being dictated primarily by the number of lines controlled by the management system 16. Essentially, the processor 18 sequences operations within the interface system S and controls the switches S1-SN.

In one operating embodiment, the switches S1-SN may be integrated with the structure of the management system 16. However, for purposes of illustration and explanation, the switches are shown as distinct elements. Functionally, the switches S1-SN simply comprise couplers for alternately coupling the associated lines OL1-OLN respectively either to the program interface system 20 or an audio disconnect signal generator 22. Thus, at any given instant, individual of the lines OL1-OLN may alternatively be connected either to the interface system 20 or the signal generator 22.

The program interface system 20 may take various forms of computerized caller service systems as have been used in the past. For example, the system may comprise a network of format selection couplings for interfacing individual callers to receive information with regard to a specific financial situation. For example, a caller might be cued: "For New York Stock Market information, push 1 . . . " and so on. Alternatively, the interface system 20 may comprise any of the well known structures for interfacing callers as to entertain, inform or advise callers. Typically, the system receives digital data from the terminals (push buttons) and provides audio signals from a voice generator, as illustrated. The system may involve other capabilities as disclosed in U.S. Pat. No. 4,792,968, granted Dec. 20, 1988, to one of the present inventors.

Functionally, the interface system 20 is capable of concurrently processing a multitude of calls; however, intervals of interface for individual callers are to be concluded at specific times. That is, while the time interval of interfaces may vary widely, they invariably proceed to a point of termination. Accordingly, at a defined point of time, an interface is to be concluded and at that instant, most callers will hang up, i.e. go "on hook". However, as recognized in the present development, many callers simply do not go "on hook". Rather, many callers will remain on the line consuming valuable time both with respect to the telephone system and the interface system S.

When an interface is to be terminated on a specific one of the lines OL1-OLN, the associated switch (one of the switches S1-SN) transfers the line from the program interface system 20 to the audio disconnect signal generator 22. Upon being connected to the audio disconnect signal generator 22, a line receives an audio termination or disconnect signal which is transmitted to the coupled telephone terminal of the terminals T1-TN. The audio termination signal may take various forms as synthesized digital formats to simulate sounds that will intuitively prompt a caller to go "on hook". Such sounds include the "click" which is heard in conventional telephone systems when a called party goes "on hook", and the traditional dial tone sound. Thus, in accordance with the operation of the disclosed embodiment, lingering callers hear a "click" (associated with the occurrence of a hang up) followed by a dial tone. Of course, the dial tone suggests the telephone terminal has been cleared ready for use to place another call. Normally, these sounds prompt a caller to hang up.

Figure 2:
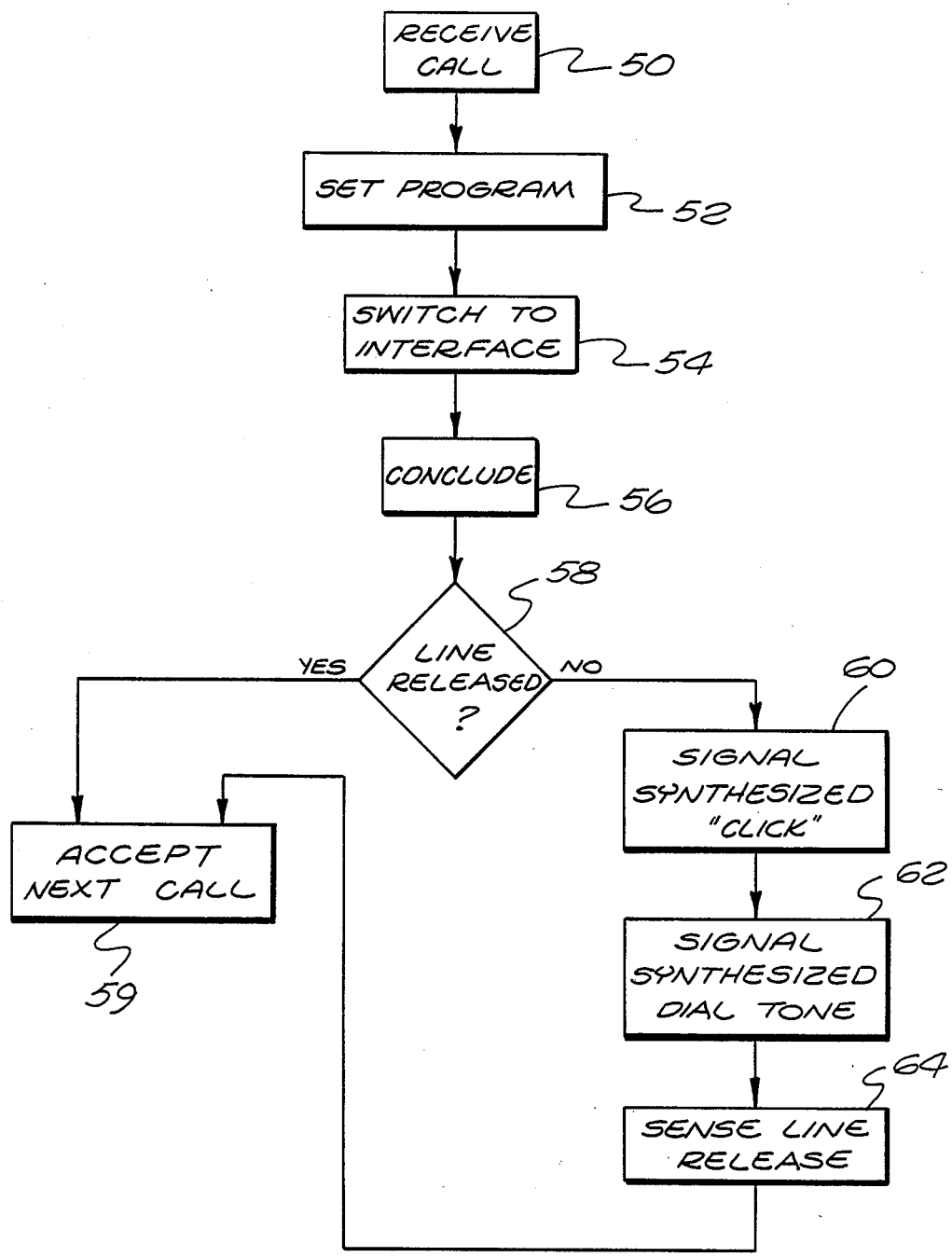
FIG. 2 is a flow diagram of the operating process of the system of FIG. 1.

In view of the above description of the disclosed embodiment, a comprehensive understanding may now best be accomplished by assuming certain operating conditions and tracing the sequence in the system of FIG. 1 as a process illustrated by FIG. 2. Accordingly, assume a caller at the terminal T1 (FIG. 1) having a desire for communication with the interface system S. Accordingly, the caller actuates the keypad panel 12 providing connection signals to the telephone facility F which result in the call being received on one of the lines IL1-ILN. The inbound call management system 16 receives the call as indicated by the block 50 (FIG. 2).

The call management system 16 (FIG. 1) preliminarily interfaces the received call and may be programmed to provide some automated communication. For example, the caller might be instructed to indicate a specific interface format or an area of interest by depressing particular keys of the panel 12. To consider the specific example of market reports, the caller might select a specific area of interest, e.g. stocks, bonds, commodities and so on. In a specific program, a caller might be instructed to depress different keys on the panel 12 to form tones with digital significance to in turn select an area of interest. Of course, in various applications of the system a multitude of different interface communications may be involved. In any event, the call is initially processed by the system 16 to interconnect the line IL1 with the line OL1 for processing the call through the switch S1 to the program interface 20. Accordingly, the program format is set as indicated by block 52 in FIG. 2.

Functioning through the call management system 16 and the switch S1, the caller at the terminal T1 now communicates with the interface system 20 (FIG. 1) as represented by the block 54 (FIG. 2). Accordingly, depending upon any of a multitude of formats and various prior program configurations, the caller may be advised, informed, entertained or enter transactions.

Ultimately, the interface communication with a caller is concluded as represented by the block 56. The interface system 20 (FIG. 1) might use any of a variety of termination techniques to confirm that the point in time has arrived when the caller should go "on hook". For example, a voice generator within the interface system 20 might generate a signal actuating the earphone 10b to produce an audio message: "Thank you for your call, good-bye". As indicated above, at that point most callers are likely to go "on hook" thereby terminating the interconnection. However, a substantial number of callers will simply remain "on the line" holding the connection through the line OL1 and the switch S1 to the program interface system 20.

The control processor 18 monitors each interface through the call management system 16 and, accordingly, sets a reasonable interval when a caller remains on the line. That is, a query is posed as indicated by the block 58 (FIG. 2) as to whether or not a line is released in a timely fashion. Pursuing the example, if the line IL1 (FIG. 1) is not released after a few seconds, the control processor 18 actuates the switch S1 decoupling the line OL1 from the interface system 20 and coupling it to the audio disconnect signal generator 22. Concurrently, the signal generator 22 is actuated to provide a synthesized signal to produce the sound of a "click" traditionally indicating a "hang up". The operation is indicated in FIG. 2 by the block 60.

Immediately after providing the synthesized "click", the signal generator 22 formulates an audio signal productive of a traditional dial tone as indicated by the block 62. Accordingly, the caller is cued to hang up by intuitive response.

The synthesized termination signals are provided from the signal generator 22 through the switch S1, the call management system 16 and the telephone facility F to the earphone 10b at the telephone terminal T1. As indicated, the caller, acting almost intuitively, will go "on hook". Accordingly, the line is released as indicated by the block 64 (FIG. 2) and operation of the system proceeds to accept another call as indicated by the block 59. That is, the line IL1 is free with the consequence that the call management system 16 preliminarily processes another call.

In view of the above explanation of the exemplary system, it will be appreciated that many embodiments of the present invention may be employed in many applications involving different programs and formats interfacing individual callers. While certain exemplary structures and operations have been described herein, the appropriate scope hereof is deemed to be in accordance with the claims as set forth below.

What is claimed is:

1. A telephonic program system to control automated interface intervals with callers at remote terminals through a telephone facility, comprising:

means for receiving telephone calls on lines through said facility for an interface interval;
    interface structure for affording an interface interval to callers for a period of time;
    a signal generator for providing an audio termination signal to actuate a telephone terminal to produce a disconnect signal sound; and
    switch structure controlled to couple received telephone call lines from said means for receiving to said interface structure for said period of time and for subsequently coupling said call lines to said signal generator after said period of time whereby to signal callers to go "on hook".

2. A telephonic programming system according to claim 1 wherein said signal generator comprises a source of a synthesized sound signal simulating a click attendant a telephone going "on hook".

3. A telephonic programming system according to claim 1 wherein said signal generator comprises a source of a synthesized sound signal simulating a dial tone.

4. A system according to claim 1 wherein said switch structure includes switch means for said interface structure and said signal generator, and further includes control means for controlling said switch means.

5. A system according to claim 4 including a multitude of switch means for accommodating a multitude of lines from said facility.

6. A system according to claim 1 wherein said interface structure includes voice generator means for receiving digital data from said terminals.

7. In association with an automated telephonic system for interfacing callers at remote terminals, a process comprising the steps of:

receiving calls on lines from said remote terminals;
    interfacing received calls to provide an interval of automated communication;
    synthesizing a disconnect audio signal;
    coupling said disconnect audio signal to said lines subsequent to said interval of interface.

8. A process according to claim 7 wherein said synthesized disconnect audio signal includes a synthesized dial tone.

* * * * *